US012664936B2

(12) United States Patent
Zhao et al.

(10) Patent No.: US 12,664,936 B2
(45) Date of Patent: Jun. 23, 2026

(54) PIXEL DRIVING CIRCUIT, CONTROL METHOD THEREOF, AND DISPLAY DEVICE

(71) Applicant: BOE Technology Group Co., Ltd., Beijing (CN)

(72) Inventors: Xuliang Zhao, Beijing (CN); Lujiang Huangfu, Beijing (CN); Jianchao Zhu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 27 days.

(21) Appl. No.: 18/021,955

(22) PCT Filed: Jun. 30, 2022

(86) PCT No.: PCT/CN2022/102760

§ 371 (c)(1),
(2) Date: Feb. 17, 2023

(87) PCT Pub. No.: WO2024/000380

PCT Pub. Date: Jan. 4, 2024

(65) Prior Publication Data

US 2024/0274073 A1 Aug. 15, 2024

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01);
(Continued)

(58) Field of Classification Search
None
See application file for complete search history.

(56) References Cited

U.S. PATENT DOCUMENTS 11,049,458 B1 * 6/2021 Fan ..................... G09G 3/3266
2011/0090202 A1 * 4/2011 Han ..................... G09G 3/3233
345/76
(Continued)

FOREIGN PATENT DOCUMENTS

CN 103927983 A 7/2014
CN 104157240 A 11/2014
(Continued)

OTHER PUBLICATIONS

Office Action dated Jul. 25, 2025, issued in counterpart CN Application No. 202280001975.9, with English translation. (11 pages).
(Continued)

*Primary Examiner* — Md Saiful A Siddiqui
(74) *Attorney, Agent, or Firm* — WHDA, LLP

(57) ABSTRACT

The present application provides a pixel driving circuit, a control method thereof, and a display device, which relates to the technical field of display. The pixel driving circuit is configured to drive a light emitting diode to emit light at different refresh rates, and includes: a first control module, a second control module, a compensation module, a refresh module, a first reset module, a first light emitting control module, a driving module, and a second light emitting control module. By holding potentials of a first node and a second node, the pixel driving circuit according to the present application may operate at different refresh rates, and the problem of insufficient Vth capture time is effectively solved.

12 Claims, 8 Drawing Sheets

(52) U.S. Cl.
CPC . *G09G 2300/0861* (2013.01); *G09G 2310/08* (2013.01); *G09G 2320/0247* (2013.01); *G09G 2340/0435* (2013.01)

(56) References Cited

U.S. PATENT DOCUMENTS

| | | | | |
|---|---|---|---|---|
| 2011/0141000 | A1* | 6/2011 | Han | G09G 3/3233 345/82 |
| 2012/0026143 | A1* | 2/2012 | Jang | G09G 3/3233 345/76 |
| 2014/0118229 | A1* | 5/2014 | Han | G09G 3/3233 345/82 |
| 2014/0139503 | A1* | 5/2014 | Han | G09G 3/3233 345/212 |
| 2014/0333515 | A1* | 11/2014 | In | G09G 3/3233 345/82 |
| 2015/0279273 | A1 | 10/2015 | Sun | |
| 2016/0372049 | A1 | 12/2016 | Wang et al. | |
| 2017/0249900 | A1* | 8/2017 | Xiang | G09G 3/3291 |
| 2019/0237019 | A1* | 8/2019 | Gao | G09G 3/3233 |
| 2020/0372862 | A1* | 11/2020 | Yamashita | G09G 3/3233 |
| 2021/0174743 | A1* | 6/2021 | Chang | G09G 3/3258 |
| 2022/0028333 | A1* | 1/2022 | Jeong | G09G 3/3275 |
| 2022/0199022 | A1* | 6/2022 | Huangfu | G09G 3/3233 |
| 2022/0343823 | A1* | 10/2022 | Wang | G09G 3/32 |
| 2023/0306905 | A1* | 9/2023 | Park | G09G 3/3233 |

FOREIGN PATENT DOCUMENTS

| | | | | |
|---|---|---|---|---|
| CN | 111243479 | A * | 6/2020 | G09G 3/20 |
| CN | 111627387 | A | 9/2020 | |
| CN | 112908245 | A | 6/2021 | |
| CN | 113053281 | A | 6/2021 | |
| CN | 113436581 | A * | 9/2021 | |
| CN | 113674695 | A | 11/2021 | |
| CN | 113838420 | A | 12/2021 | |
| KR | 20100045578 | A | 5/2010 | |

OTHER PUBLICATIONS

Office Action dated Jan. 30, 2026, issued in counterpart CN Application No. 202280001975.9, with English translation. (25 pages).

* cited by examiner

PIXEL DRIVING CIRCUIT, CONTROL METHOD THEREOF, AND DISPLAY DEVICE

TECHNICAL FIELD

The present application relates to the technical field of display, in particular to a pixel driving circuit, a control method thereof, and a display device.

BACKGROUND

With the continuous development of technologies, users expect display devices to support both a high refresh rate to avoid flicker and a low refresh rate to reduce power consumption. However, current display devices cannot meet the requirements of the high refresh rate and the low refresh rate at the same time. As a result, requirements of the users may not be met, and the experience of the users is poor.

SUMMARY

The technical solutions adopted by embodiments of the present application are as follows.

In one aspect, an embodiment of the present application provides a pixel driving circuit. The pixel driving circuit is configured to drive a light emitting diode to emit light at different refresh rates, including:

a first control module and a second control module, wherein the first control module is electrically connected to a first gate line, a first initial signal line, and a first node, and configured to write an initial signal of the first initial signal line to the first node under the control of a gate signal of the first gate line, and to hold a potential of the first node at different refresh rates; the second control module is electrically connected to a second gate line, a first voltage signal line, and a second node, and configured to write a voltage signal of the first voltage signal line to the second node under the control of a gate signal of the second gate line, and to hold a potential of the second node at different refresh rates;

a compensation module, wherein the compensation module is electrically connected to a reset signal line, a fourth node, and the first node, and configured to conduct a path between the fourth node and the first node under the control of a reset signal of the reset signal line, and to hold the potential of the first node at different refresh rates;

a refresh module, wherein the refresh module is electrically connected to the first gate line, a data signal line, and a third node, and configured to write a data signal of the data signal line to the third node under the control of the gate signal of the first gate line;

a first reset module, wherein the first reset module is electrically connected to the reset signal line, the first initial signal line, and an anode of the light emitting diode, and configured to reset the anode via the initial signal of the first initial signal line under the control of the reset signal of the reset signal line;

a first light emitting control module, wherein the first light emitting control module is electrically connected to a first light emitting control signal line, a second voltage signal line, the third node, and the first node, and configured to write a voltage signal of the second voltage signal line to the third node under the control of a control signal of the first light emitting control signal line; and a driving module and a second light emitting control module, wherein the driving module is electrically connected to the first node, the first voltage signal line, and the fourth node, the second light emitting control module is electrically connected to a second light emitting control signal line, the fourth node, and the anode, the driving module and the second light emitting control module are configured to transmit electrical signals for causing the light emitting diode to emit light to the anode under the control of the first node and the second light emitting control signal line, respectively.

According to an embodiment of the present application, further including:

a second reset module, wherein the second reset module is electrically connected to a scan signal line, a second initial signal line, and a sixth node, and configured to reset the driving module via an initial signal of the second initial signal line under the control of a scan signal of the scan signal line; and a third light emitting control module, wherein the third light emitting control module is electrically connected to a third light emitting control signal line, the first voltage signal line, and the sixth node, and configured to write a first voltage signal of the first voltage signal line to the driving module under the control of a third light emitting control signal of the third light emitting control signal line.

According to an embodiment of the present application, the compensation module includes a second transistor; and the second transistor has a control electrode electrically connected to the reset signal line, a first electrode electrically connected to the fourth node, and a second electrode electrically connected to the first node.

According to an embodiment of the present application, the compensation module includes a second transistor and a ninth transistor;

the second transistor has a control electrode electrically connected to the reset signal line, a first electrode electrically connected to the fourth node, and a second electrode electrically connected to a first electrode of the ninth transistor; and the ninth transistor has a control electrode electrically connected to the second gate line, and a second electrode electrically connected to the first node.

According to an embodiment of the present application, the second control module includes a fifth transistor; and the fifth transistor has a control electrode electrically connected to the second gate line, a first electrode electrically connected to the first voltage signal line, and a second electrode electrically connected to the second node.

According to an embodiment of the present application, the second control module includes a tenth transistor and an eleventh transistor;

the tenth transistor has a control electrode electrically connected to a first second gate line, a first electrode electrically connected to the first voltage signal line, and a second electrode electrically connected to the second node; and the eleventh transistor has a control electrode electrically connected to a second second gate line, a first electrode electrically connected to the first voltage signal line, and a second electrode electrically connected to the second node.

According to an embodiment of the present application, the first control module includes a fourth transistor; and the fourth transistor has a control electrode electrically connected to the first gate line, a first electrode electrically connected to the first initial signal line, and a second electrode electrically connected to the first node.

According to an embodiment of the present application, the refresh module includes a first transistor; and the first transistor has a control electrode electrically connected to the first gate line, a first electrode electrically connected to the data signal line, and a second electrode electrically connected to the third node.

According to an embodiment of the present application, the first reset module includes a sixth transistor; and the sixth transistor has a control electrode electrically connected to the reset signal line, a first electrode electrically connected to the first initial signal line, and a second electrode electrically connected to the anode.

According to an embodiment of the present application, the first light emitting control module includes a seventh transistor, a first capacitor, and a second capacitor;

the seventh transistor has a control electrode electrically connected to the first light emitting control signal line, a first electrode electrically connected to the second voltage signal line, and a second electrode electrically connected to the third node;

the first capacitor has a first electrode electrically connected to the third node, and a second electrode electrically connected to the second node; and the second capacitor has a first electrode electrically connected to the second node, and a second electrode electrically connected to the first node.

According to an embodiment of the present application, the driving module includes a third transistor; and the third transistor has a control electrode electrically connected to the first node, a first electrode electrically connected to the first voltage signal line, and a second electrode electrically connected to the fourth node.

According to an embodiment of the present application, the second light emitting control module includes an eighth transistor; and the eighth transistor has a control electrode electrically connected to the second light emitting control signal line, a first electrode electrically connected to the fourth node, and a second electrode electrically connected to the anode.

According to an embodiment of the present application, the second reset module includes a twelfth transistor, and the twelfth transistor has a control electrode electrically connected to the scan signal line, a first electrode electrically connected to the second initial signal line, and a second electrode electrically connected to the sixth node; and the third light emitting control module includes a thirteenth transistor, and the thirteenth transistor has a control electrode electrically connected to the third light emitting control signal line, a first electrode electrically connected to the first voltage signal line, and a second electrode electrically connected to the sixth node.

According to an embodiment of the present application, the second transistor includes an oxide transistor.

According to an embodiment of the present application, the ninth transistor includes an oxide transistor, and the second transistor includes a non-oxide transistor.

According to an embodiment of the present application, the fifth transistor includes an oxide transistor.

According to an embodiment of the present application, at least one of the tenth transistor and the eleventh transistor includes an oxide transistor.

According to an embodiment of the present application, the fourth transistor includes an oxide transistor.

In another aspect, an embodiment of the present application provides a display device. The display device includes the above-mentioned pixel driving circuit.

In yet another aspect, an embodiment of the present application provides a control method of the above-mentioned pixel driving circuit. The method includes:

at different refresh rates, refreshing a display frame in a display frame cycle through a first reset phase, a write phase, a compensation phase, and a first light emitting phase.

In yet another aspect, an embodiment of the present application provides a control method of the above-mentioned pixel driving circuit. The method includes:

at a first refresh rate, refreshing a display frame in a display frame cycle through a first reset phase, a write phase, a compensation phase, and a first light emitting phase; and at a second refresh rate, performing a first refresh on the display frame in the display frame cycle through the first reset phase, the write phase, the compensation phase, and the first light emitting phase, and performing refreshes other than the first refresh on the display frame through a second reset phase and a second light emitting phase.

The above description is only an overview of the technical solution of the present application. In order to better understand the technical means of the present application, it can be implemented according to the contents of the specification, and in order to make the above and other purposes, features and advantages of the present application more obvious and understandable, the specific implementation methods of the present application are listed below.

BRIEF DESCRIPTION OF THE DRAWINGS

In order to more clearly explain the embodiments of the present application or the technical solutions in related art, the following will briefly introduce the drawings that need to be used in the embodiments or the description of the prior art. It is obvious that the drawings in the following description are only some embodiments of the present application. For ordinary technicians in the art, other drawings can also be obtained from these drawings without any creative work.

DETAILED DESCRIPTION

Figure 1:
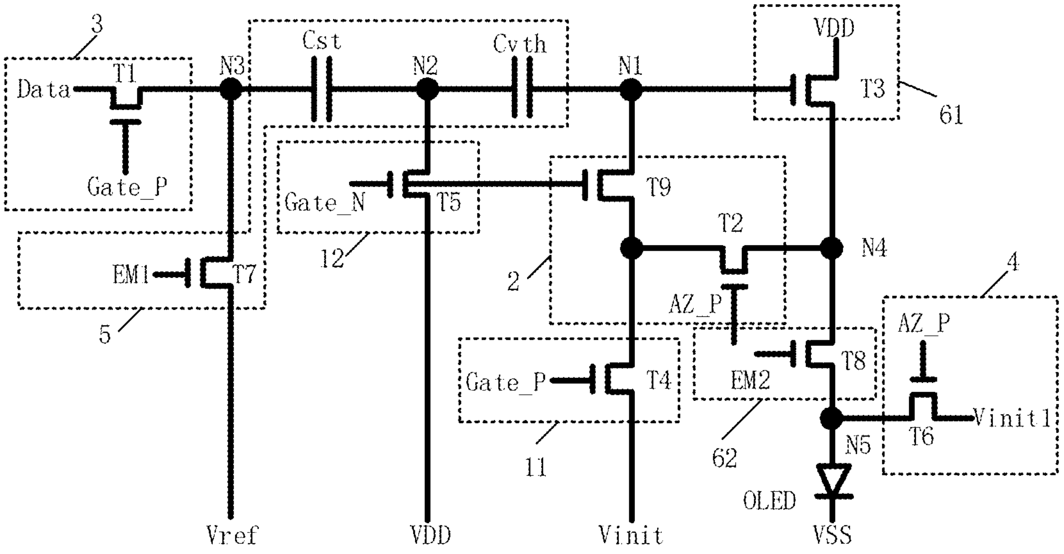
FIG. 1 is a schematic diagram of a pixel driving circuit according to an embodiment of the present application.

In order to make the purpose, technical scheme and advantages of the embodiments of the present application clearer, the technical solution in the embodiments of the present application will be described clearly and completely in combination with the drawings in the embodiments of the present application. Obviously, the described embodiments are part of the embodiments of the present application, not all of them. Based on the embodiments in the present application, all other embodiments obtained by ordinary technicians in the art without creative work fall within the scope of protection in the present application.

In the drawings, the same reference numerals represent the same or similar structures, and their detailed description will be omitted. In addition, the attached drawings are only schematic illustrations of the present application, and are not necessarily drawn to scale.

Unless the context otherwise requires, the term "including" is interpreted as "including, but not limited to" in the entire specification and claims. In the description of the specification, the terms "one embodiment", "some embodiments", "exemplary embodiments", "examples", "specific examples" or "some examples" are intended to indicate that specific features, structures, materials or characteristics related to the embodiment or example are included in at least one embodiment or example of the present application. The schematic representation of the above terms does not necessarily refer to the same embodiment or example. In addition, the specific features, structures, materials or features described may be included in any one or more embodiments or examples in any appropriate manner.

In the embodiment of the present application, the words "first", "second", "third", "fourth", "fifth", "sixth", "seventh", "eighth", "ninth", "tenth", "eleventh" and other words are used to distinguish the same or similar items with basically the same function and action, just to clearly describe the technical solution of the embodiment of the present application. It cannot be understood as indicating or implying relative importance or implying the number of technical features indicated.

According to embodiments of the present application, a gate of a transistor is referred to as a control electrode, and one of a source and a drain of the transistor is referred to as a first electrode and the other as a second electrode. According to embodiments of the present application, taking the first electrode of each transistor being referred to as a drain and the second electrode as a source as an example to illustrate.

According to embodiments of the present application, the term "electrically connected" may mean that two components are electrically connected directly, or that two components are electrically connected to each other via one or more other components.

An embodiment of the present application provides a pixel driving circuit. The pixel driving circuit is configured to drive a light emitting diode to emit light at different refresh rates.

Referring to FIG. 1, the pixel driving circuit includes:

a first control module 11 and a second control module 12.

The first control module 11 is electrically connected to a first gate line Gate_P, a first initial signal line Vinit1, and a first node N1, and configured to write an initial signal of the first initial signal line Vinit1 to the first node N1 under the control of a gate signal of the first gate line Gate_P, and to hold a potential of the first node N1 at different refresh rates. The second control module 12 is electrically connected to a second gate line Gate_N, a first voltage signal line VDD, and a second node N2, and configured to write a voltage signal of the first voltage signal line VDD to the second node N2 under the control of a gate signal of the second gate line Gate_N, and to hold a potential of the second node N2 at different refresh rates.

For example, when the pixel driving circuit operates at a high refresh rate (e.g., a refresh rate of 120 HZ), the potentials of the first node and the second node may be held, and the first node and the second node basically have no leakage. However, when the pixel driving circuit operates at a low refresh rate (e.g., below 30 Hz, like 10 HZ, 1 Hz or lower), the first node and the second node are prone to leakage due to the long refresh time at the low refresh rate, which makes it impossible to achieve normal display. Therefore, the pixel driving circuit needs to hold the potentials of the first node and the second node even at the low refresh rate, and accordingly the pixel driving circuit may also achieve normal display at the low refresh rate.

Figure 2:
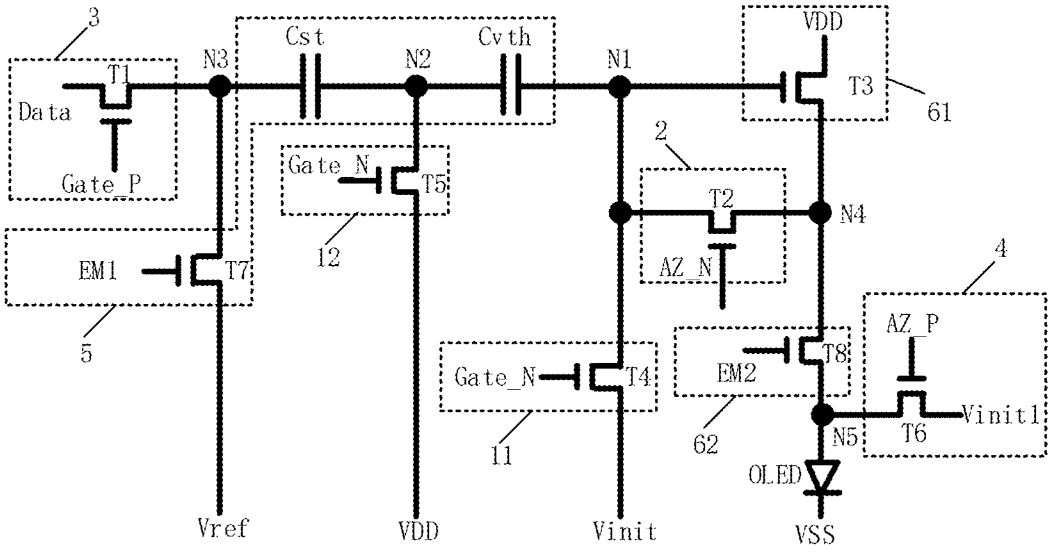
FIG. 2 is a schematic diagram of another pixel driving circuit according to an embodiment of the present application.
Figure 3:
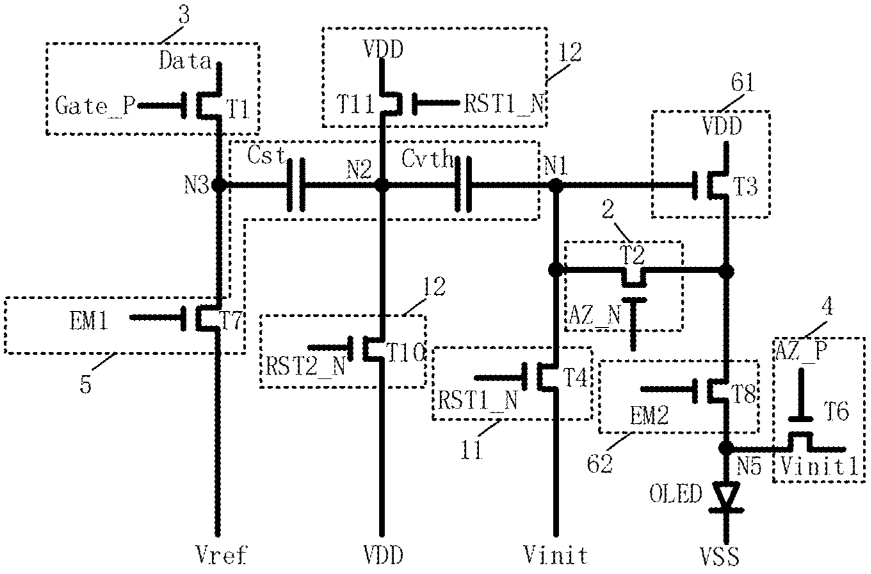
FIG. 3 is a schematic diagram of yet another pixel driving circuit according to an embodiment of the present application.

There is no limitation on how the pixel driving circuit may hold the potentials of the first node and the second node at the low refresh rate. For example, at least one transistor connected to the first node and the second node may be set as an oxide transistor to reduce a leakage current of the first node and the second node in the light emitting phase, for example, to reduce the leakage current to below 1e-15 A. In this way, the potentials of the first node and the second node may be better held in the light emitting phase to avoid poor display. In FIG. 1, a fifth transistor T5 and a ninth transistor T9 are both oxide transistors, so that the potential of the second node N2 in the light emitting phase may be held by the fifth transistor T5, and the potential of the first node N1 in the light emitting phase may be held by the ninth transistor T9. In FIG. 2, the fifth transistor T5, a second transistor T2 and a fourth transistor T4 are all oxide transistors, so that the potential of the second node N2 in the light emitting phase may be held by the fifth transistor T5, and the potential of the first node N1 in the light emitting phase may be held by the second transistor T2 and the fourth transistor T4. In FIG. 3, a tenth transistor T10, an eleventh transistor T11, the second transistor T2 and the fourth transistor T4 are all oxide transistors, so that the potential of the second node N2 in the light emitting phase may be held by the tenth transistor T10 and the eleventh transistor T11, and the potential of the first node N1 in the light emitting phase may be held by the second transistor T2 and the fourth transistor T4.

The material of an active layer in the oxide transistor is not specifically limited. For example, the material of the active layer in the oxide transistor may include indium gallium zinc oxide (IGZO), indium tin zinc oxide (ITZO), indium zinc oxide (IZO), etc.

The type and quantity of the transistors included in the second control module are not specifically limited herein. For example, referring to FIG. 1 and FIG. 2, the second control module 12 includes the fifth transistor T5, where the fifth transistor T5 is an oxide transistor, so that the potential of the second node N2 in the light emitting phase may be held by the fifth transistor T5. Referring to FIG. 3, the second control module 12 includes the tenth transistor T10 and the eleventh transistor T11, where the tenth transistor T10 and the eleventh transistors T11 are both oxide transistors, so that the potential of the second node N2 in the light emitting phase may be held by the tenth transistor T10 and the eleventh transistor T11.

The pixel driving circuit further includes a compensation module 2. The compensation module is electrically connected to a reset signal line AZ (a first reset signal line AZ_P in FIG. 1), a fourth node N4, and the first node N1, and configured to conduct a path between the fourth node N4 and the first node N1 under the control of a reset signal of the reset signal line AZ (the first reset signal line AZ_P in FIG. 1), and to hold the potential of the first node N1 at different refresh rates.

The quantity of the above-mentioned reset signal lines is not specifically limited herein. For example, referring to FIG. 1, the reset signal line AZ includes the first reset signal line AZ_P. Alternatively, referring to FIG. 2 and FIG. 3, the reset signal line AZ includes the first reset signal line AZ_P and a second reset signal line AZ_N.

For example, when the pixel driving circuit operates at a high refresh rate (e.g., a refresh rate of 120 Hz), the potential of the first node may be held, and the first node basically has no leakage. However, when the pixel driving circuit operates at a low refresh rate (e.g., below 30 Hz, like 10 Hz, 1 Hz or lower), the first node is prone to leakage due to the long refresh time at the low refresh rate, which makes it impossible to achieve normal display. Therefore, the pixel driving circuit needs to hold the potential of the first node even at the low refresh rate and accordingly the pixel driving circuit may also achieve normal display at the low refresh rate.

The type and quantity of the transistors included in the compensation module are not specifically limited herein. For example, referring to FIG. 1, the compensation module 2 includes the second transistor T2 and the ninth transistor T9, where the ninth transistor T9 is an oxide transistor, so that the potential of the first node N1 in the light emitting phase may be held by the ninth transistor T9. Referring to FIG. 2 and FIG. 3, the compensation module 2 includes the second transistor T2, where the second transistor T2 is an oxide transistor and the fourth transistor is also an oxide transistor, so that the potential of the first node N1 may be held by the second transistor T2 and the fourth transistor T4.

The pixel driving circuit further includes: a refresh module 3, electrically connected to the first gate line Gate_P, a data signal line Data, and a third node N3, and configured to write a data signal of the data signal line Data to the third node N3 under the control of the gate signal of the first gate line Gate_P;

- a first reset module 4, electrically connected to the reset signal line AZ (the first reset signal line AZ_P in FIG. 1), the first initial signal line Vinit1, and an anode of the light emitting diode, and configured to reset the anode via the initial signal of the first initial signal line Vinit1 under the control of the reset signal of the reset signal line AZ (the first reset signal line AZ_P in FIG. 1);
- a first light emitting control module 5, electrically connected to a first light emitting control signal line EM1, a second voltage signal line Vref, the third node N3, and the first node N1, and configured to write a voltage signal of the second voltage signal line Vref to the third node N3 under the control of a control signal of the first light emitting control signal line EM1; and
- a driving module 61 and a second light emitting control module 62. The driving module 61 is electrically connected to the first node N1, the first voltage signal line VDD, and the fourth node N4. The second light emitting control module 62 is electrically connected to a second light emitting control signal line EM2, the fourth node N4, and the anode. The driving module 61 and the second light emitting control module 62 are configured to transmit electrical signals for causing the light emitting diode to emit light to the anode under the control of the first node N1 and the second light emitting control signal line EM2, respectively.

Referring to FIG. 1, FIG. 2 and FIG. 3, the anode of the light emitting diode may be electrically connected to a fifth node N5, and a cathode of the light emitting diode may be electrically connected to a ground terminal VSS.

The specific circuit structure of the first control module, the second control module, the compensation module, the refresh module, the first reset module, the first light emitting control module, the second light emitting control module and a third light emitting control module is not limited, as long as corresponding function is met.

The first node, the second node, the third node, the fourth node and the fifth node are defined only for the convenience of describing a circuit structure, and the first node, the second node, the third node, the fourth node and the fifth node are not an actual circuit unit.

It is to be noted that, firstly, in addition to the above-mentioned oxide transistors, the other transistors in FIG. 1, FIG. 2 and FIG. 3 may all be non-oxide transistors, such as low temperature poly-silicon (LTPS) transistors. Certainly, at least one of the other transistors may also be an oxide transistor, which is not specifically limited here.

Secondly, in FIG. 1, the fifth transistor T5 and the ninth transistor T9 share a second gate line Gate_N, and certainly, the fifth transistor T5 and the ninth transistor T9 may also each have a second gate line Gate_N, depending on the actual application.

In the pixel driving circuit according to the embodiment of the present application, the potential of the first node is held at different refresh rates by the first control module and the compensation module, the potential of the second node is held at different refresh rates by the second control module, and the process of writing the signal to the third node by the refresh module and the process of threshold voltage compensation by the compensation module may be realized separately. Therefore, on the one hand, by holding the potentials of the first node and the second node, the pixel driving circuit may operate at different refresh rates, that is, the pixel driving circuit may switch operating states at different refresh rates, thereby having a wider application range. In addition, the pixel driving circuit operates stably at a low refresh rate. On the other hand, by separating the Vdt refresh process of writing a Data signal to the third node from the process of threshold voltage Vth capture, the problem of insufficient Vth capture time is effectively solved, so that a desirable capacitor charging rate and Vth capture accuracy may be achieved, and a better display effect may be achieved. Thereby, through cooperation of the first control module, the second control module, the compensation module, the refresh module, the first reset module, the first light emitting control module, the second light emitting control module and the third light emitting control module, the light emitting diode may emit light stably at different refresh rates. Moreover, the Vth compensation time is adjustable, the Vth compensation time is sufficient, and the problems of short-term image sticking and Mura may be effectively solved.

Figure 15:
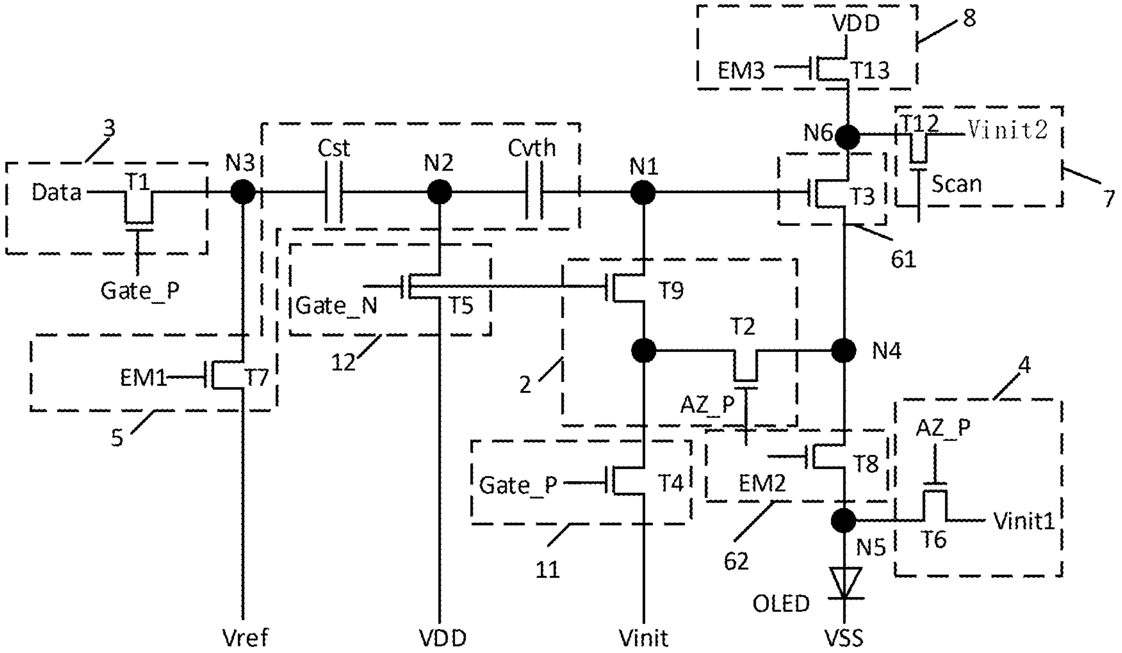
FIG. 15 is a schematic diagram of another pixel driving circuit according to an embodiment of the present application.

According to one embodiment of the embodiment, referring to FIG. 15, the pixel driving circuit further includes:

a second reset module 7, electrically connected to a scan signal line Scan, a second initial signal line Vinit2, and a sixth node N6, and configured to reset the driving module 61 via an initial signal of the second initial signal line Vinit2 under the control of a scan signal of the scan signal line Scan; and the third light emitting control module 8, electrically connected to a third light emitting control signal line EM3, the first voltage signal line VDD, and the sixth node N6, and configured to write the first voltage signal of the first voltage signal line VDD to the driving module 61 under the control of a third light emitting control signal of the third light emitting control signal line EM3.

The sixth node is defined only for the convenience of describing the circuit structure, and the sixth node is not an actual circuit unit.

According to one embodiment of the present application, referring to FIG. 2 and FIG. 3, the compensation module 2 includes a second transistor T2. The second transistor T2 has a control electrode electrically connected to the reset signal line AZ (the second reset signal line AZ_N in FIG. 2 and FIG. 3), a first electrode electrically connected to the fourth node N4, and a second electrode electrically connected to the first node N1. Therefore, the potential of the first node may be held by the second transistor and accordingly the pixel driving circuit may achieve a good display effect at different refresh rates.

The type of the above-mentioned second transistor is not limited here. For example, the second transistor may be an oxide transistor.

According to one embodiment of the present application, referring to FIG. 1, the compensation module 2 includes the second transistor T2 and the ninth transistor T9. The second transistor T2 has a control electrode electrically connected to the reset signal line AZ (the first reset signal line AZ_P in FIG. 1), a first electrode electrically connected to the fourth node N4, and a second electrode electrically connected to a first electrode of the ninth transistor T9. The ninth transistor T9 has a control electrode electrically connected to the second gate line Gate_N, and a second electrode electrically connected to the first node N1. Therefore, the potential of the first node may be held by the ninth transistor and accordingly the pixel driving circuit may achieve a good display effect at different refresh rates.

The type of the above-mentioned ninth transistor is not limited here. For example, the ninth transistor may be an oxide transistor.

The type of the above-mentioned second transistor is not limited here. For example, the second transistor may be a non-oxide transistor, such as a low temperature poly-silicon transistor.

According to one embodiment of the present application, referring to FIG. 1 and FIG. 2, the second control module 12 includes the fifth transistor T5. The fifth transistor has a control electrode electrically connected to the second gate line Gate_N, a first electrode electrically connected to the first voltage signal line VDD, and a second electrode electrically connected to the second node N2. Therefore, the potential of the second node may be held by the fifth transistor and accordingly the pixel driving circuit may achieve a good display effect at different refresh rates.

The number of second gate lines is not specifically limited here, but may be determined according to the number of thin film transistors in the second control module. When the second control module includes one thin film transistor, such as the fifth transistor T5 in FIG. 1 and FIG. 2, one second gate line is provided. When the second control module includes two thin film transistors, such as the tenth transistor T10 and the eleventh transistor T11 in FIG. 3, two second gate lines (including a first second gate line RST1_N and a second second gate line RST2_N in FIG. 3, respectively) are provided.

According to one embodiment of the present application, referring to FIG. 3, the second control module 12 includes the tenth transistor T10 and the eleventh transistor T11. The tenth transistor T10 has a control electrode electrically connected to the first second gate line RST1_N, a first electrode electrically connected to the first voltage signal line VDD, and a second electrode electrically connected to the second node N2. The eleventh transistor T11 has a control electrode electrically connected to the second second gate line RST2_N, a first electrode electrically connected to the first voltage signal line VDD, and a second electrode electrically connected to the second node N2. Therefore, the potential of the second node may be held by the tenth transistor and the eleventh transistor, and accordingly the pixel driving circuit may achieve a good display effect at different refresh rates.

According to one embodiment of the present application, referring to FIG. 1, FIG. 2 and FIG. 3, the first control module 11 includes the fourth transistor T4. The fourth transistor T4 has a control electrode electrically connected to the first gate line Gate_P, a first electrode electrically connected to the first initial signal line Vinit1, and a second electrode electrically connected to the first node N1.

Referring to FIG. 2 and FIG. 3, in the case that the compensation module 2 includes only the second transistor T2, the fourth transistor T4 and the second transistor T2 are oxide transistors, so that the potential of the first node N1 may be held by the fourth transistor T4 and the second transistor T2.

According to one embodiment of the present application, referring to FIG. 1, FIG. 2 and FIG. 3, the refresh module 3 includes a first transistor T1. The first transistor T1 has a control electrode electrically connected to the first gate line Gate_P, a first electrode electrically connected to the data signal line Data, and a second electrode electrically connected to the third node N3.

According to one embodiment of the present application, referring to FIG. 1, FIG. 2 and FIG. 3, the first reset module 4 includes a sixth transistor T6. The sixth transistor T6 has a control electrode electrically connected to the reset signal line AZ (the first reset signal line AZ_P in FIG. 1, FIG. 2 and FIG. 3), a first electrode electrically connected to the first initial signal line Vinit1, and a second electrode electrically connected to the anode.

According to one embodiment of the present application, referring to FIG. 1, FIG. 2 and FIG. 3, the first light emitting control module 5 includes a seventh transistor T7, a first capacitor Cst, and a second capacitor Cvth. The seventh transistor T7 has a control electrode electrically connected to the first light emitting control signal line EM1, a first electrode electrically connected to the second voltage signal line Vref, and a second electrode electrically connected to the third node N3. The first capacitor Cst has a first electrode electrically connected to the third node N3, and a second electrode electrically connected to the second node N2. The second capacitor Cvth has a first electrode electrically connected to the second node N2, and a second electrode electrically connected to the first node N1.

According to one embodiment of the present application, referring to FIG. 1, FIG. 2 and FIG. 3, the driving module 61 includes a third transistor T3. The third transistor T3 has a control electrode electrically connected to the first node N1, a first electrode electrically connected to the first voltage signal line VDD, and a second electrode electrically connected to the fourth node N4. According to the embodiment of the present application, the third transistor has a long hysteresis relaxation time, which may effectively solve the problems of short-term image sticking and Mura.

According to one embodiment of the present application, referring to FIG. 1, FIG. 2 and FIG. 3, the second light emitting control module 62 includes an eighth transistor T8. The eighth transistor T8 has a control electrode electrically connected to the second light emitting control signal line EM2, a first electrode electrically connected to the fourth node N4, and a second electrode electrically connected to the anode.

According to one embodiment of the present application, referring to FIG. 15, the second reset module 7 includes a twelfth transistor T12. The twelfth transistor T12 has a control electrode electrically connected to the scan signal line Scan, a first electrode electrically connected to the second initial signal line Vinit2, and a second electrode electrically connected to the sixth node N6.

The third light emitting control module 8 includes a thirteen transistor. The thirteenth transistor T13 has a control electrode electrically connected to the third light emitting control signal line EM3, a first electrode electrically connected to the first voltage signal line VDD, and a second electrode electrically connected to the sixth node N6.

According to one embodiment of the present application, the second transistor includes an oxide transistor.

The material of an active layer in the above-mentioned oxide transistor is not specifically limited. For example, the material of the active layer in the oxide transistor may include indium gallium zinc oxide (IGZO), indium tin zinc oxide (ITZO), indium zinc oxide (IZO), etc.

Referring to FIG. 2 and FIG. 3, the second transistor T2 includes an oxide transistor, and the potential of the first node N1 may be held through the second transistor T2.

It is to be noted that in FIG. 2 and FIG. 3, the fourth transistor T4 may also include an oxide transistor, and the potential of the first node N1 may be jointly held through the second transistor T2 and the fourth transistor T4.

According to one embodiment of the present application, the ninth transistor includes an oxide transistor and the second transistor includes a non-oxide transistor.

The material of an active layer in the above-mentioned non-oxide transistor is not specifically limited here. For example, the material of the active layer in the non-oxide transistor may include LTPS.

Referring to FIG. 1, the ninth transistor T9 includes an oxide transistor, and the potential of the first node N1 may be held by the ninth transistor T9.

It is to be noted that the type of the second transistor and the fourth transistor is not specifically limited here, and the second transistor and the fourth transistor may be oxide transistors or non-oxide transistors, depending on the actual application.

According to one embodiment of the present application, the fifth transistor includes an oxide transistor.

Referring to FIG. 1 and FIG. 2, the fifth transistor T5 includes the oxide transistor, and the potential of the second node N2 may be held by the fifth transistor T5.

According to one embodiment of the present application, at least one of the tenth transistor and the eleventh transistor includes an oxide transistor.

At least one of the tenth transistor and the eleventh transistor including an oxide transistor means that the tenth transistor includes an oxide transistor; alternatively, the eleventh transistor includes an oxide transistor; alternatively, the tenth transistor and the eleventh transistor both include oxide transistors. Referring to FIG. 3, the tenth transistor T10 and the eleventh transistor T11 both include oxide transistors, and the potential of the second node N2 may be held by the tenth transistor T10 and the eleventh transistor T11.

According to one embodiment of the present application, the fourth transistor includes an oxide transistor.

Referring to FIG. 2 and FIG. 3, the fourth transistor T4 includes an oxide transistor, and the potential of the first node N1 may be held through the fourth transistor T4.

It is to be noted that in FIG. 2 and FIG. 3, the second transistor T2 may also include an oxide transistor, and the potential of the first node N1 may be jointly held by the second transistor T2 and the fourth transistor T4.

In order to unify the production process and simplify a subsequent circuit driving method, all the above-mentioned oxide transistors are N-type transistors, and all the non-oxide transistors are P-type transistors. Certainly, all the oxide transistors may also be P-type transistors and all the non-oxide transistors may also be N-type transistors; alternatively, all the transistors may be N-type transistors; alternatively, all the transistors may be P-type transistors, which has similar design principles as the present application and also falls within the scope of the present application.

The type of the transistors is not limited. The transistors may be thin film transistors which may be low temperature poly-silicon thin film transistors or oxide thin film transistors.

It is to be noted that, firstly, when the pixel driving circuit is applied to an OLED display device, the light emitting diode is an organic light emitting diode; and when the pixel driving circuit is applied to a Mini LED display device or a Micro LED display device, the light emitting diode is a Mini LED or a Micro LED.

Secondly, during design of the layout structure of the pixel driving circuit, due to the parasitic capacitance between a data line and the first node N1, the second node N2 and the third node N3, deviation of a voltage written to a gate of the third transistor T3 may be caused, which results in crosstalk and affects the display effect. In order to avoid this problem, the parasitic capacitance between the data line and the nodes needs to be reduced by, for example, increasing the distance between the data line and the nodes.

An embodiment of the present application further provides a display device. The display device includes the above-mentioned pixel driving circuit.

The display device may be a flexible display device (also referred to as a flexible screen) or a rigid display device (i.e., a display that may not be bent), which is not limited here.

The display device may be an organic light emitting diode (OLED) display device, a Micro LED display device or a Mini LED display device, and any products or components with display functions, such as TVs, digital cameras, cell phones, tablet computers, that include these display devices.

The display device may also be applied to the fields of identification, medical devices, etc. Products that have been promoted or have good promotion prospects include security identification, smart door locks, medical image capture, etc. The display device has the advantages of capacity of operating at different refresh rates, good display effect at a low refresh rate, desirable capacitance charging rate and Vth capture accuracy, high die-cutting yield, low cost, good display effect, long service life, high stability, high contrast, high imaging quality, high product quality, etc.

An embodiment of the present application further provides a control method of the above-mentioned pixel driving circuit. The control method includes:

S1. at different refresh rates, refreshing a display frame in a display frame cycle through a first reset phase, a write phase, a compensation phase, and a first light emitting phase.

Figure 4:
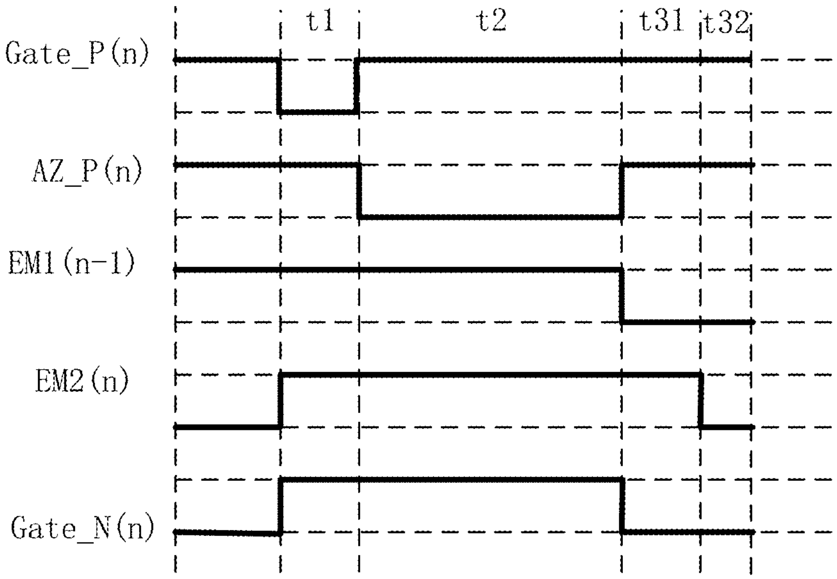
FIG. 4 is a driving timing diagram of a pixel driving circuit according to an embodiment of the present application.

Taking the fifth transistor and the ninth transistor as N-type oxide transistors and the first transistor, the second transistor, the third transistor, the fourth transistor, the sixth transistor, the seventh transistor and the eighth transistor as P-type low-temperature poly-silicon transistors as examples, and combining with a timing diagram of each signal line as shown in FIG. 4, the operating principle of the pixel driving circuit as shown in FIG. 1 according to the embodiment of the present application at the same refresh rate (a high refresh rate or a low refresh rate) is described in detail. It is to be noted that in FIG. 7 to FIG. 10, a transistor being off is marked by "x", and a light emitting diode not emitting light is also marked by "x".

In the first reset phase and the write phase, i.e., phase t1 in FIG. 4, a negative voltage signal is input to a first gate line Gate_P, and positive voltage signals are input to a first reset signal line AZ_P, a first light emitting control signal line EM1, a second light emitting control signal line EM2, and a second gate line Gate_N. In this case, referring to FIG. 7, the first transistor T1, the fifth transistor T5, the fourth transistor T4, and the ninth transistor T9 are turned on, and the second transistor T2, the third transistor T3, the sixth transistor T6, the seventh transistor T7, and the eighth transistor T8 are turned off. Since the first transistor T1 is turned on, a data signal of a data signal line Data may be written to a third node N3, and the third node N3 is refreshed. Since the fourth transistor T4 and the ninth transistor T9 are turned on, an initial signal of a first initial signal line Vinit1 may be written to a first node N1, and the first node N1 is reset. Since the fifth transistor T5 is turned on, a voltage signal of a first voltage signal line VDD may be written to a second node N2, and the second node N2 is reset.

In the compensation phase, i.e., phase t2 in FIG. 4, a negative voltage signal is input to the first reset signal line AZ_P, and positive voltage signals are input to the first gate line Gate_P, the first light emitting control signal line EM1, the second light emitting control signal line EM2, and the second gate line Gate_N. In this case, referring to FIG. 8, since the seventh transistor T7 is turned off, the third node N3 holds the data signal written by the data signal line Data. Since the fifth transistor T5 is turned on, the second node N2 holds the voltage signal written by the first voltage signal line VDD. Since the first node N1 turns on the third transistor under the control of the initial signal of the first initial signal line Vinit1 and the second transistor is turned on, the voltage signal of the first voltage signal line VDD may be written to the first node N1, and the first node N1 is compensated to a potential VDD+Vth. Since the sixth transistor T6 is turned on, a reset signal of the first reset signal line AZ_P may be written to an anode of a light emitting diode to reset the anode.

The first light emitting phase refers to phases t31 and t32 in FIG. 4. In phase t31, a negative voltage signal is input to the first light emitting control signal line EM1 and the second gate line Gate_N, and positive voltage signals are input to the first reset signal line AZ_P, the first gate line Gate_P, and the second light emitting control signal line EM2. In this case, referring to FIG. 9, the seventh transistor T7 is turned on, a control signal of the first light emitting control signal line EM1 may be written to the third node N3, and the potential on the third node N3 jumps from Vdata to Vref, so that the potential on the second node N2 changes to VDD+(Vref−VData), the potential on the first node N1 changes to VDD+Vth+(Vref−VData), and the third transistor T3 is turned on.

In phase t32, negative voltage signals are input to the first light emitting control signal line EM1 and the second light emitting control signal line EM2, and positive voltage signals are input to the first reset signal line AZ_P, the first gate line Gate_P, and the second gate line Gate_N. In this case, referring to FIG. 10, the third transistor T3 and the eighth transistor T8 are turned on, and the light emitting diode emits light. A calculation formula of a current I flowing through the light emitting diode is: $I=k(Vgs-Vth)^2$, where k is a constant, and Vgs is a gate-to-source voltage of the third transistor T3. By plugging the formulas in phase t31, a final calculation formula of the current I flowing through the light emitting diode is: $I=k(Vref-Vdt)^2$. It may be seen that the current calculation formula is independent of the voltage signal of the first voltage signal line VDD, that is, the pixel driving circuit according to the embodiment of the present application may also compensate for the voltage of the first voltage signal line VDD.

Figure 6:
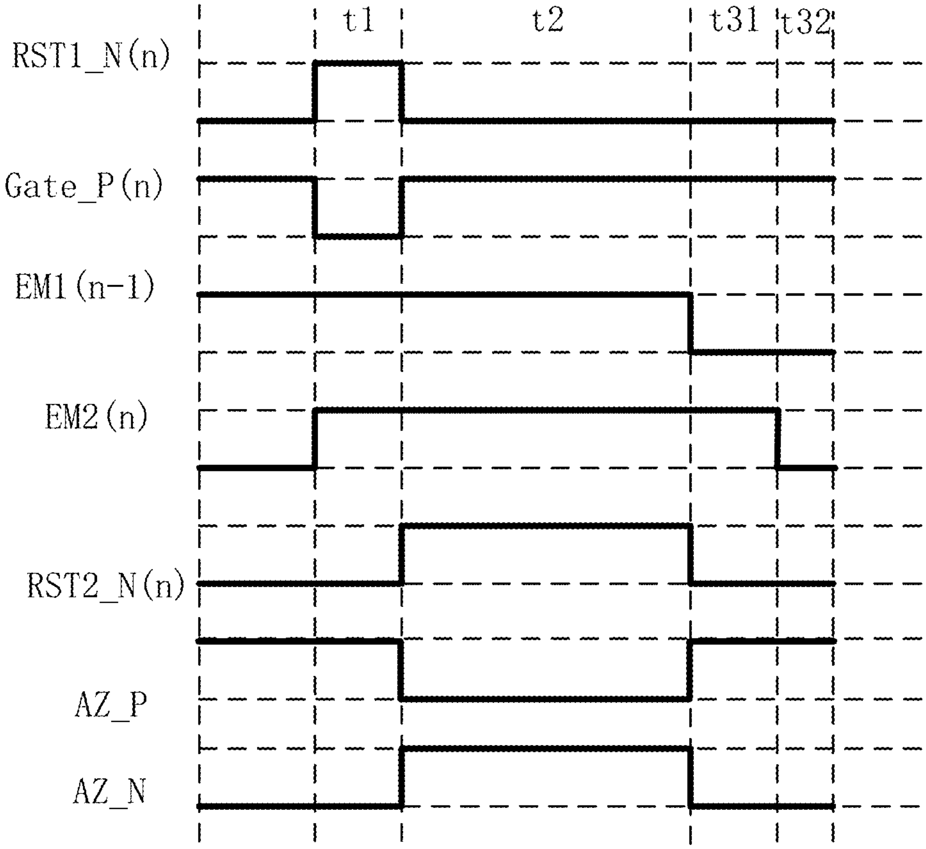
FIG. 6 is a driving timing diagram of yet another pixel driving circuit according to an embodiment of the present application.
Figure 7:
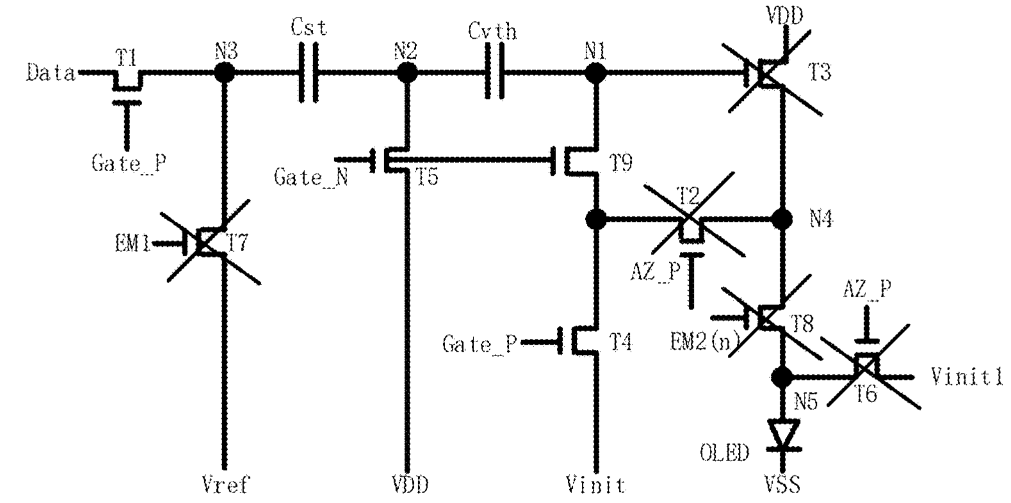
FIG. 7 to FIG. 10 are schematic diagrams of a driving principle of a pixel driving circuit in FIG. 1 under driving timing in FIG. 4.
Figure 8:
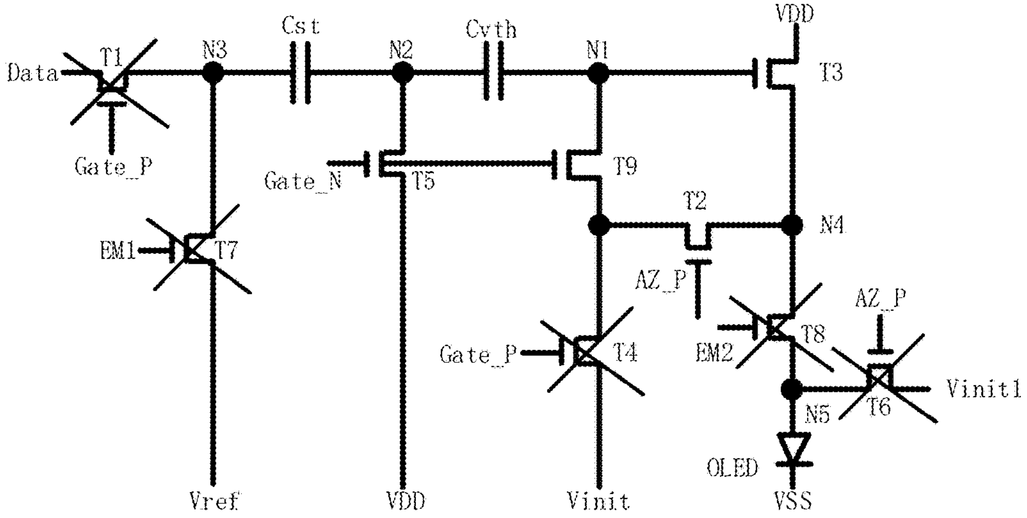
Figure 9:
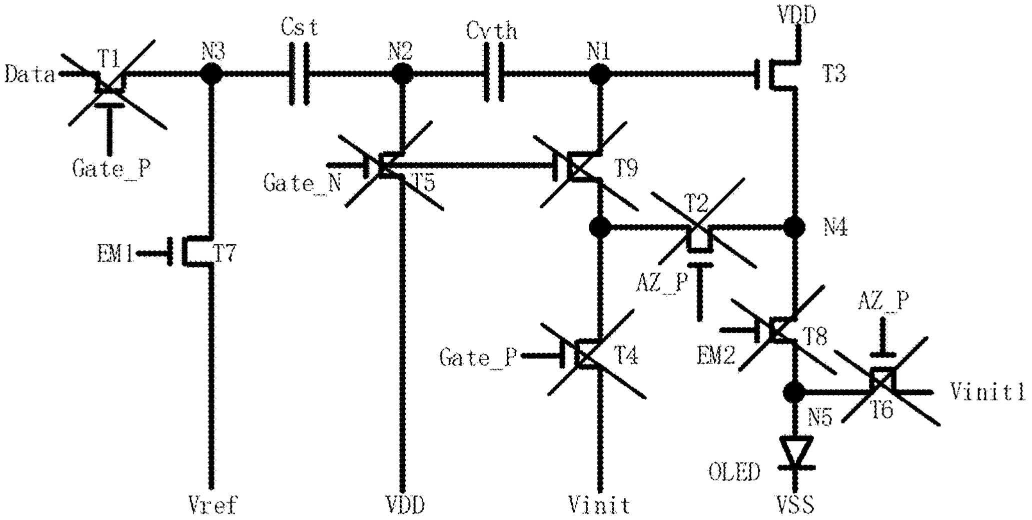
Figure 10:
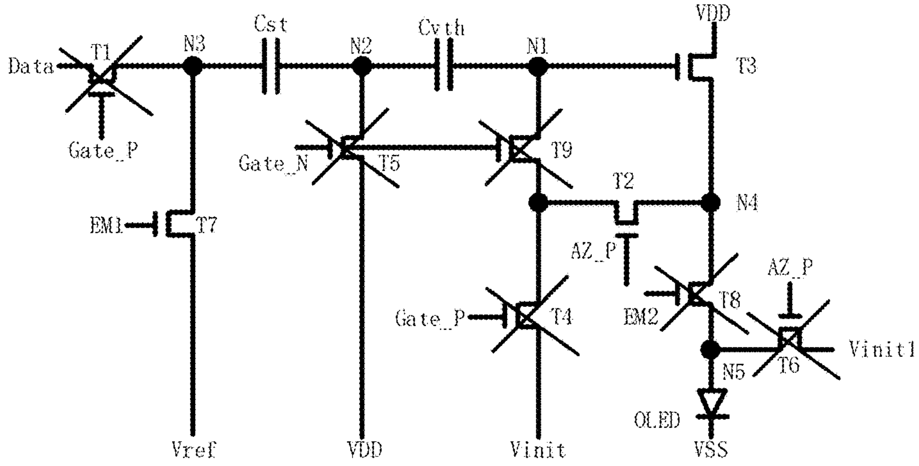
Figure 11:
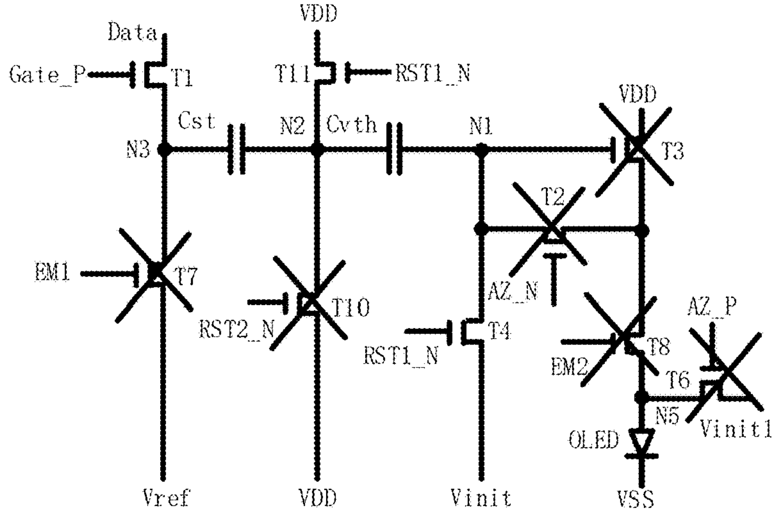
FIG. 11 to FIG. 14 are schematic diagrams of a driving principle of a pixel driving circuit in FIG. 3 under driving timing in FIG. 6.
Figure 12:
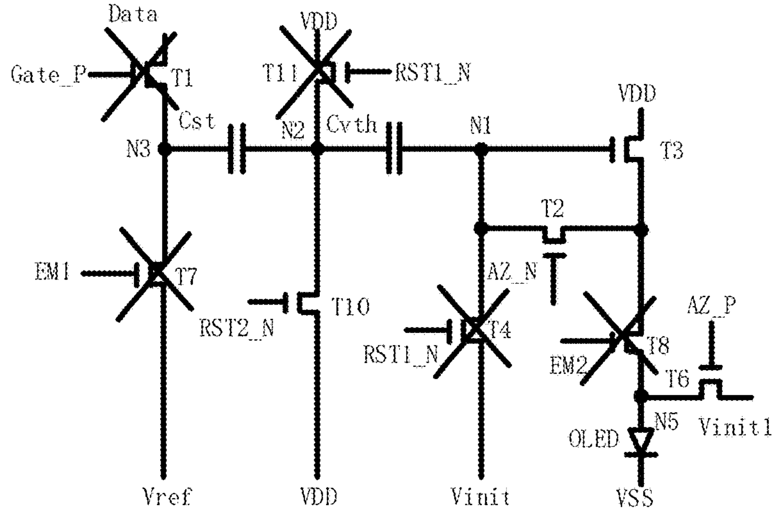
Figure 13:
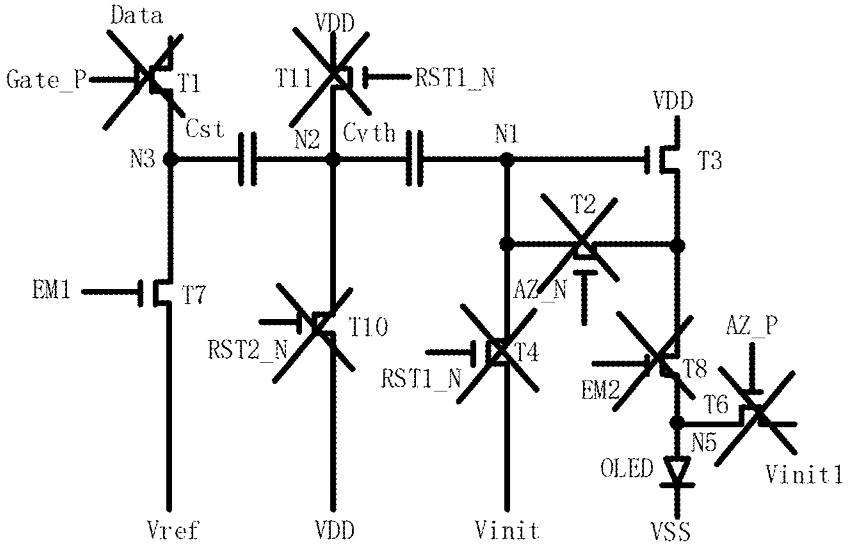
Figure 14:
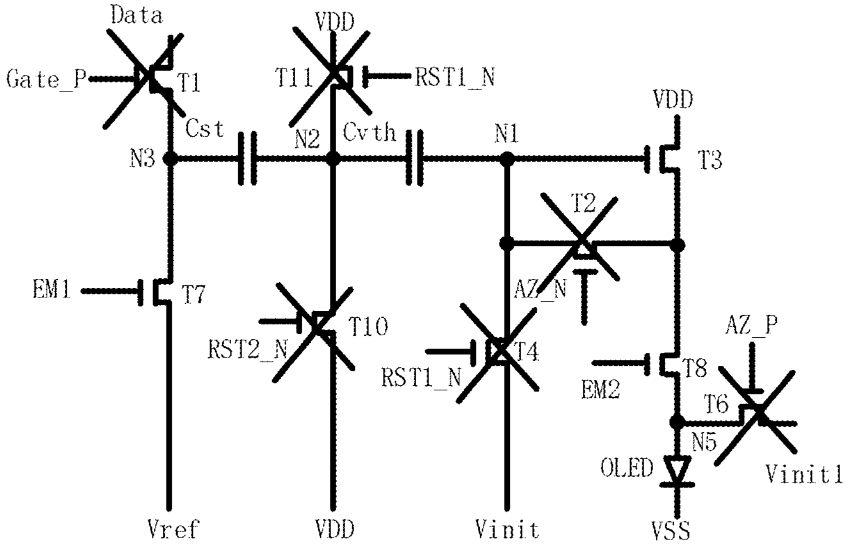

Taking the fifth transistor, the ninth transistor, a tenth transistor and an eleventh transistor as N-type oxide transistors and the first transistor, the second transistor, the third transistor, the fourth transistor, the sixth transistor, the seventh transistor and the eighth transistor as P-type low-temperature poly-silicon transistors as examples, and combining with a timing diagram of each signal line as shown in FIG. 6, the operating principle of the pixel driving circuit as shown in FIG. 3 according to the embodiment of the present application at the same refresh rate (a high refresh rate or a low refresh rate) is described in detail. It is to be noted that in FIG. 11 to FIG. 14, a transistor being off is marked by "x", and a light emitting diode not emitting light is also marked by "x".

In the first reset phase and the write phase, i.e., phase t1 in FIG. 6, negative voltage signals are input to the first gate line Gate_P, a second second gate line RST2_N, and a second reset signal line AZ_N, and positive voltage signals are input to a first second gate line RST1_N, the first light emitting control signal line EM1, the second light emitting control signal line EM2, and the first reset signal line AZ_P. In this case, referring to FIG. 11, the first transistor T1, the eleventh transistor T11, and the fourth transistor T4 are turned on, and the second transistor T2, the third transistor T3, the sixth transistor T6, the seventh transistor T7, the eighth transistor T8, and the tenth transistor T10 are turned off. Since the first transistor T1 is turned on, a data signal of a data signal line Data may be written to a third node N3, and the third node N3 is refreshed. Since the fourth transistor T4 is turned on, the initial signal of the first initial signal line Vinit1 may be written to the first node N1, and the first node N1 is reset. Since the eleventh transistor T11 is turned on, the voltage signal of the first voltage signal line VDD may be written to the second node N2, and the second node N2 is reset.

In the compensation phase, i.e., phase t2 in FIG. 6, negative voltage signals are input to the first second gate line RST1_N and the first reset signal line AZ_P, and positive voltage signals are input to the first gate line Gate_P, the second second gate line RST2_N, the second reset signal line AZ_N, the first light emitting control signal line EM1, and the second light emitting control signal line EM2. In this case, referring to FIG. 12, since the seventh transistor T7 is turned off, the third node N3 holds the data signal written by the data signal line Data. Since the tenth transistor T10 is turned on, the second node N2 holds the voltage signal written by the first voltage signal line VDD. Since the first node N1 turns on the third transistor under the control of the initial signal of the first initial signal line Vinit1 and the second transistor is turned on, the voltage signal of the first voltage signal line VDD may be written to the first node N1, and the first node N1 is compensated to a potential VDD+Vth. Since the sixth transistor T6 is turned on, a reset signal of the first reset signal line AZ_P may be written to an anode of a light emitting diode to reset the anode.

The first light emitting phase refers to phases t31 and t32 in FIG. 6. In phase t31, negative voltage signals are input to the first second gate line RST1_N, the first light emitting control signal line EM1, the second second gate line RST2_N, and the second reset signal line AZ_N, and positive voltage signals are input to the first reset signal line AZ_P, the first gate line Gate_P, and the second light emitting control signal line EM2. In this case, referring to FIG. 13, the seventh transistor T7 is turned on, the control signal of the first light emitting control signal line EM1 may be written to the third node N3, and the potential on the third node N3 jumps from Vdata to Vref, so that the potential on the second node N2 changes to VDD+(Vref−VData), the potential on the first node N1 changes to VDD+Vth+(Vref−VData), and the third transistor T3 is turned on.

In phase t32, negative voltage signals are input to the first second gate line RST1_N, the first light emitting control signal line EM1, the second second gate line RST2_N, the second reset signal line AZ_N, and the second light emitting control signal line EM2, and positive voltage signals are input to the first reset signal line AZ_P and the first gate line Gate_P. In this case, referring to FIG. 14, the third transistor T3 and the eighth transistor T8 are turned on, and the light emitting diode emits light. A calculation formula of the current I flowing through the light emitting diode is: $I=k(Vgs-Vth)^2$, where k is a constant, and Vgs is the gate-to-source voltage of the third transistor T3. By plugging the formulas in phase t31, the final calculation formula of the current I flowing through the light emitting diode is: $I=k(Vref-Vdt)^2$. It may be seen that the current calculation formula is independent of the voltage signal of the first voltage signal line VDD, that is, the pixel driving circuit according to the embodiment of the present application may also compensate for the voltage of the first voltage signal line VDD.

Figure 16:
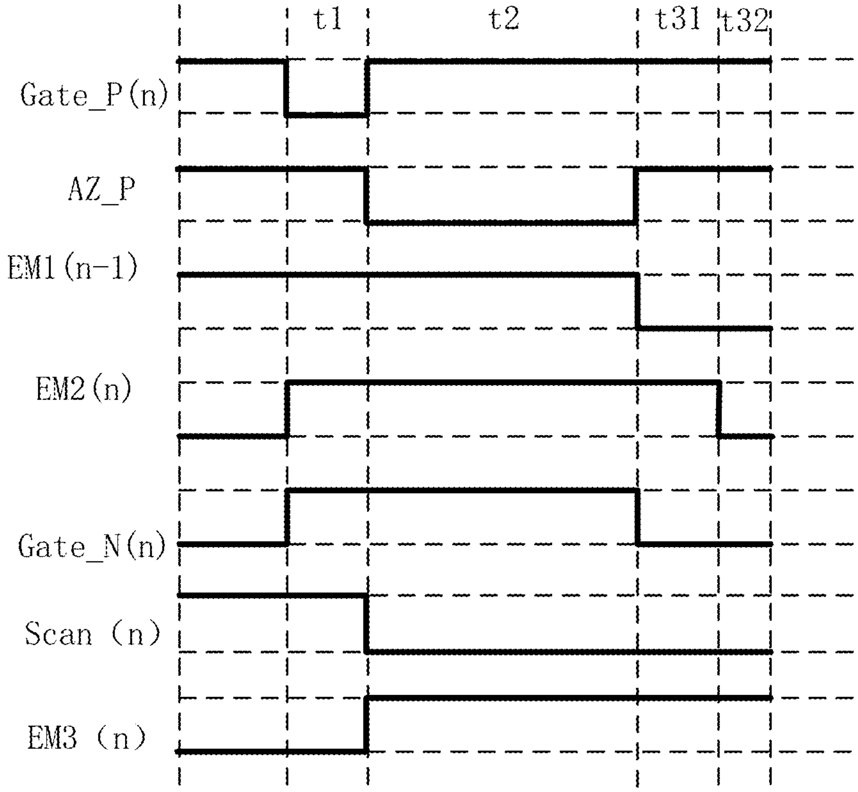
FIG. 16 is a driving timing diagram of another pixel driving circuit according to an embodiment of the present application.

It is to be noted that, firstly, the above process may also be applied to the timing diagram shown in FIG. 16 to control the pixel driving circuit diagram shown in FIG. 15, the difference being that a twelfth transistor T12 and a thirteenth transistor T13 are added in FIG. 15 on the basis of FIG. 1. Therefore, referring to FIG. 16, in the first reset phase and the write phase, i.e., phase t1 in FIG. 16, a positive voltage signal is input to a third light emitting control signal line EM3, and the thirteenth transistor T13 is turned off, and a negative voltage signal is input to a scan signal line Scan, and the twelfth transistor T12 is turned on, thereby enabling a source-drain reset on the third transistor T3 (i.e., a driving transistor).

In the compensation phase, i.e., phase t2 in FIG. 16, and in the first light emitting phase, i.e., phases t31 and t32 in FIG. 16, a positive voltage signal is input to the scan signal line Scan, and the twelfth transistor T12 is turned off, and a negative voltage signal is input to the third light emitting control signal line EM3, and the thirteenth transistor T13 is turned on, thereby allowing the voltage signal of the first voltage signal line VDD to be input to the third transistor T3. In this way, the source-drain reset of the driving transistor may be enabled, the on state of the driving transistor is kept stable, and the low gray-scale flicker of the pixel driving circuit at a low refresh rate is solved.

Figure 17:
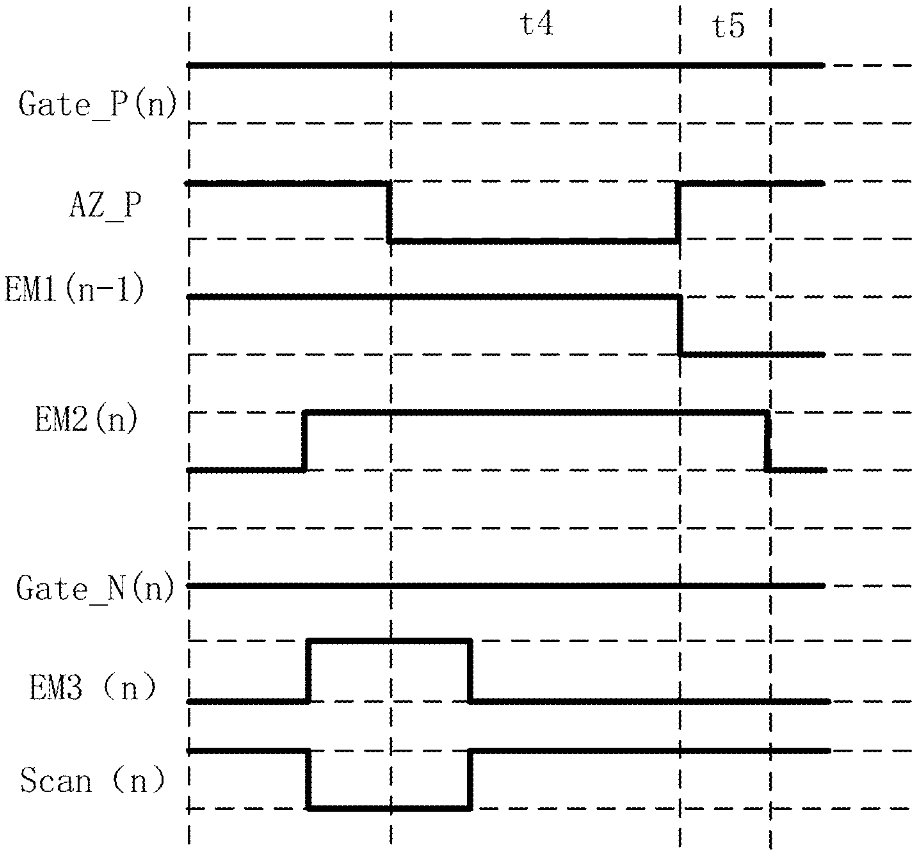
FIG. 17 is a driving timing diagram of yet another pixel driving circuit according to an embodiment of the present application.

Certainly, the first reset signal line electrically connected to a control electrode of the sixth transistor in FIG. 15 may be replaced by the scan signal line, and accordingly the timing in FIG. 17 needs to be changed, which will not be repeated here.

Secondly, at least two GOA circuits are required to implement the timing diagram in FIG. 6, where the first reset signal line AZ_P is controlled by one of the GOA circuits controls, and the other signal lines are controlled by the other GOA circuit. Certainly, it is also possible to control the pixel driving circuit shown in FIG. 3 by one GOA circuit, which requires corresponding signal lines and timing diagram, for example, the sixth transistor is controlled by the first gate line Gate_P and the second transistor is controlled by the second second gate line RST2_N, which will not be repeated here.

Thirdly, for the sake of simplicity of driving timing, driving timing signals of the first second gate line RST1_N, the first light emitting control signal line EM1, the second second gate line RST2_N, the second reset signal line AZ_N, the second light emitting control signal line EM2, the first reset signal line AZ_P, and the first gate line Gate_P according to the embodiment of the present application are only one of the cases, and may also be driving signals of other timing in practical applications.

Fourthly, in FIG. 4, FIG. 6 and FIG. 16, n−1 represents a signal of the previous line and n represents a signal of a current line.

Fifthly, the specific relationship between the effective pulse width of the negative voltage signal input to the first reset signal line AZ_P in the compensation phase and the effective pulse width of the negative voltage signal input to the first gate line Gate_P in the write phase may be determined according to the model and size of a display device. For example, the ratio of the duration of the negative voltage signal input to the first reset signal line AZ_P in the compensation phase to the duration of the negative voltage signal input to the first gate line Gate_P in the write phase ranges from 3 to 32. For example, the duration of the negative voltage signal input to the first gate line Gate_P in the write phase is one hour, and the duration of the negative voltage signal input to the first reset signal line AZ_P in the compensation phase is three hours, five hours, six hours, seven hours, eight hours, ten hours, twelve hours, fifteen hours, etc. depending on the actual application. Therefore, by effectively prolonging the duration of Vth capture in the compensation phase, the Vth capture accuracy may be further improved, and the problems of short-term image sticking and Mura may be effectively solved.

The above-mentioned control method may be applied to the pixel driving circuit according to the above embodiment, and the structure of the pixel driving circuit may be as shown in FIG. 1, FIG. 2 or FIG. 3.

In this way, through the first reset phase, the write phase, the compensation phase, and the first light emitting phase, on the one hand, the pixel driving circuit may refresh a display frame at different rates, with good display effects at different rates; on the other hand, by separating the Vdt refresh process of writing the Data signal to the third node from the process of threshold voltage Vth capture, the problem of insufficient Vth detection time is effectively solved, a desirable capacitor charging rate and Vth detection accuracy may be achieved, and a better display effect may be achieved.

An embodiment of the present application further provides a control method of the above-mentioned pixel driving circuit. The control method includes:

S2. At a first refresh rate, refreshing a display frame in a display frame cycle through a first reset phase, a write phase, a compensation phase, and a first light emitting phase.

The first refresh rate may be a high refresh rate (e.g., a refresh rate of 100 Hz), and the timing of the pixel driving circuit operating at the high refresh rate may refer to the above embodiment, that is, FIG. 1 and FIG. 2 refer to the timing in FIG. 4, and FIG. 3 refers to the timing in FIG. 6, which will not be repeated here.

S3. At a second refresh rate, performing a first refresh on the display frame in the display frame cycle through the first reset phase, the write phase, the compensation phase, and the first light emitting phase, and performing refreshes other than the first refresh on the display frame through a second reset phase and a second light emitting phase.

The second refresh rate may be a low refresh rate (e.g., a refresh rate of 10 Hz), and the pixel driving circuit may refer to the timing shown in FIG. 4 and FIG. 5 when operating at the low refresh rate, as described below.

Figure 5:
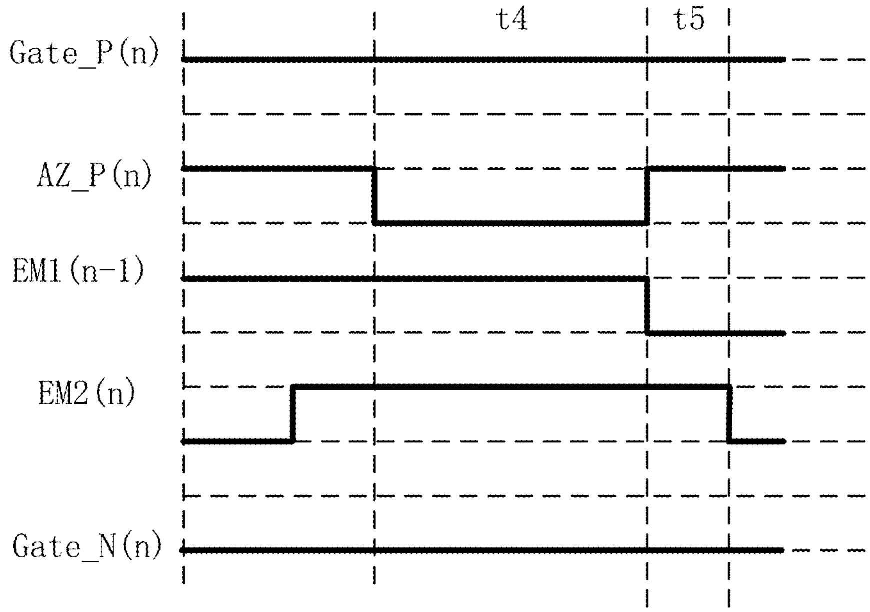
FIG. 5 is a driving timing diagram of another pixel driving circuit according to an embodiment of the present application.

Taking a fifth transistor and a ninth transistor as N-type oxide transistors and a first transistor, a second transistor, a third transistor, a fourth transistor, a sixth transistor, a seventh transistor and an eighth transistor as P-type low-temperature poly-silicon transistors as examples, and combining with the timing diagrams of each signal line as shown in FIG. 4 and FIG. 5, the operating principle of the pixel driving circuit as shown in FIG. 1 according to the embodiment of the present application at the same refresh rate (a high refresh rate or a low refresh rate) is described in detail.

In the first reset phase and the write phase, i.e., phase t1 in FIG. 4, a negative voltage signal is input to a first gate line Gate_P, and positive voltage signals are input to a first reset signal line AZ_P, a first light emitting control signal line EM1, a second light emitting control signal line EM2, and a second gate line Gate_N. In this case, referring to FIG. 7, the first transistor T1, the fifth transistor T5, the fourth transistor T4, and the ninth transistor T9 are turned on, and the second transistor T2, the third transistor T3, the sixth transistor T6, the seventh transistor T7, and the eighth transistor T8 are turned off. Since the first transistor T1 is turned on, a data signal of a data signal line Data may be written to a third node N3, and the third node N3 is refreshed. Since the fourth transistor T4 and the ninth transistor T9 are turned on, an initial signal of a first initial signal line Vinit1 may be written to a first node N1, and the first node N1 is reset. Since the fifth transistor T5 is turned on, a voltage signal of a first voltage signal line VDD may be written to a second node N2, and the second node N2 is reset.

In the compensation phase, i.e., phase t2 in FIG. 4, a negative voltage signal is input to the first reset signal line AZ_P, and positive voltage signals are input to the first gate line Gate_P, the first light emitting control signal line EM1, the second light emitting control signal line EM2, and the second gate line Gate_N. In this case, referring to FIG. 8, since the seventh transistor T7 is turned off, the third node N3 holds the data signal written by the data signal line Data. Since the fifth transistor T5 is turned on, the second node N2 holds the voltage signal written by the first voltage signal line VDD. Since the first node N1 turns on the third transistor under the control of the initial signal of the first initial signal line Vinit1 and the second transistor is turned on, the voltage signal of the first voltage signal line VDD may be written to the first node N1, and the first node N1 is compensated to a potential VDD+Vth. Since the sixth transistor T6 is turned on, a reset signal of the first reset signal line AZ_P may be written to an anode of a light emitting diode to reset the anode.

The first light emitting phase refers to phases t31 and t32 in FIG. 4. In phase t31, a negative voltage signal is input to the first light emitting control signal line EM1 and the second gate line Gate_N, and positive voltage signals are input to the first reset signal line AZ_P, the first gate line Gate_P, and the second light emitting control signal line EM2. In this case, referring to FIG. 9, the seventh transistor T7 is turned on, a control signal of the first light emitting control signal line EM1 may be written to the third node N3, and the potential on the third node N3 jumps from Vdata to Vref, so that the potential on the second node N2 changes to VDD+(Vref−VData), the potential on the first node N1 changes to VDD+Vth+(Vref−VData), and the third transistor T3 is turned on.

In phase t32, negative voltage signals are input to the first light emitting control signal line EM1 and the second light emitting control signal line EM2, and positive voltage signals are input to the first reset signal line AZ_P, the first gate line Gate_P, and the second gate line Gate_N. In this case, referring to FIG. 10, the third transistor T3 and the eighth transistor T8 are turned on, and the light emitting diode emits light. A calculation formula of the current I flowing through the light emitting diode is: $I=k(Vgs-Vth)^2$, where k is a constant, and Vgs is the gate-to-source voltage of the third transistor T3. By plugging the formulas in phase t31, the final calculation formula of the current I flowing through the light emitting diode is: $I=k(Vref-Vdt)^2$. It may be seen that the current calculation formula is independent of the voltage signal of the first voltage signal line VDD, that is, the pixel driving circuit according to the embodiment of the present application may also compensate for the voltage of the first voltage signal line VDD.

In the second reset phase, i.e., phase t4 in FIG. 5, a negative voltage signal is input to the first reset signal line AZ_P, and positive voltage signals are input to the first light emitting control signal line EM1, the second light emitting control signal line EM2, the first gate line Gate_P, and the second gate line Gate_N. In this case, the sixth transistor T6 is turned on, a reset signal of the first reset signal line AZ_P may be written to the anode of the light emitting diode to reset the anode.

In the second light emitting phase, i.e., phase t5 in FIG. 5, a negative voltage signal is input to the first light emitting control signal line EM1, and positive voltage signals are input to the second light emitting control signal line EM2, the first reset signal line AZ_P, the first gate line Gate_P, and the second gate line Gate_N. In this case, the third transistor T3 and the eighth transistor T8 are turned on, and the light emitting diode emits light.

The above-mentioned control method may be applied to the pixel driving circuit according to the above embodiment, and the structure of the pixel driving circuit may be as shown in FIG. 1 or FIG. 2.

It is to be noted that, firstly, the above process may also be applied to the timing diagram shown in FIG. 17 to control the pixel driving circuit diagram shown in FIG. 15, the difference being that a twelfth transistor T12 and a thirteenth transistor T13 are added in FIG. 15 on the basis of FIG. 1. Therefore, referring to FIG. 17, in the second reset phase, i.e., phase t4 in FIG. 17, a positive voltage signal is input to a third light emitting control signal line EM3 firstly, and the thirteenth transistor T13 is turned off; and a negative voltage signal is input to a scan signal line Scan firstly, and the twelfth transistor T12 is turned on, thereby enabling a source-drain reset on the third transistor T3 (i.e., a driving transistor). Then, in phases t4 and t5 in FIG. 17, a high voltage signal is input to the scan signal line Scan, and the twelfth transistor T12 is turned off; and a low voltage signal is input to the third light emitting control signal line EM3, and the thirteenth transistor T13 is turned on, thereby allowing the voltage signal of the first voltage signal line VDD to be written to the third transistor T3. In this way, the source-drain reset of the driving transistor may be enabled, the on state of the driving transistor is kept stable, and the low gray-scale flicker of the pixel driving circuit at a low refresh rate is solved.

Certainly, the first reset signal line electrically connected to a control electrode of the sixth transistor in FIG. 15 may be replaced by the scan signal line, and accordingly the timing in FIG. 17 needs to be changed, which will not be repeated here.

Secondly, in FIG. 5 and FIG. 17, n−1 represents a signal of the previous line and n represents a signal of a current line.

In this way, a display frame may be refreshed at the high refresh rate through the first reset phase, the write phase, the compensation phase and the first light emitting phase; at the same time, by starting the second reset phase and the second light emitting phase in time sequence to reset the anode at a high frame rate, a display frame may be refreshed at the low refresh rate through the first reset phase, the write phase, the compensation phase, the first light emitting phase, the second reset phase, and the second light emitting phase. Moreover, the pixel driving circuit may reduce leakage in the light emitting holding phase and avoid flicker in a case of switching upon completion of the second light emitting phase, and the problem of low gray-scale flicker is effectively solved.

The embodiment of the present application provides the control method by which the above-mentioned pixel driving circuit may drive the light emitting diode to emit light. The driving timing of the control method is simple and easy to implement.

A large number of specific details are described in the specification provided here. However, it can be understood that the embodiments of the present application can be practiced without these specific details. In some examples, the well-known methods, structures and techniques are not shown in detail so as not to obscure the understanding of this specification.

Finally, it should be noted that the above embodiments are only used to illustrate the technical solution of the present application, not to limit it. Although the present application has been described in detail with reference to the preceding embodiments, those skilled in the art should understand that they can still modify the technical solutions recorded in the preceding embodiments or replace some of the technical features equally. However, these modifications or replacements do not make the essence of the corresponding technical solutions deviate from the spirit and scope of the technical solutions of the embodiments of the present application.

The invention claimed is:

1. A pixel driving circuit, wherein the pixel driving circuit is configured to drive a light emitting diode to emit light at different refresh rates, and the pixel driving circuit comprises:

a first control module and a second control module, wherein the first control module is electrically connected to a first gate line, a first initial signal line, and a first node, and configured to write an initial signal of the first initial signal line to the first node under the control of a gate signal of the first gate line, and to hold a potential of the first node at different refresh rates; the second control module is electrically connected to a second gate line, a first voltage signal line, and a second node, and configured to write a voltage signal of the first voltage signal line to the second node under the control of a gate signal of the second gate line, and to hold a potential of the second node at different refresh rates;

a compensation module, wherein the compensation module is electrically connected to a reset signal line, a fourth node, and the first node, and configured to conduct a path between the fourth node and the first node under the control of a reset signal of the reset signal line, and to hold the potential of the first node at different refresh rates;

a refresh module, wherein the refresh module is electrically connected to the first gate line, a data signal line, and a third node, and configured to write a data signal of the data signal line to the third node under the control of the gate signal of the first gate line;

a first reset module, wherein the first reset module is electrically connected to the reset signal line, the first initial signal line, and an anode of the light emitting diode, and configured to reset the anode via the initial signal of the first initial signal line under the control of the reset signal of the reset signal line;

a first light emitting control module, wherein the first light emitting control module is electrically connected to a first light emitting control signal line, a second voltage signal line, the third node, and the first node, and configured to write a voltage signal of the second voltage signal line to the third node under the control of a first control signal of the first light emitting control signal line; and a driving module and a second light emitting control module, wherein the driving module is electrically connected to the first node, the first voltage signal line, and the fourth node, the second light emitting control module is electrically connected to a second light emitting control signal line, the fourth node, and the anode, the driving module and the second light emitting control module are configured to transmit electrical signals for causing the light emitting diode to emit light in a first light emitting phase, to the anode under the control of the first node and a second control signal of the second light emitting control signal line, respectively, wherein:

the first light emitting control module comprises a seventh transistor, a first capacitor, and a second capacitor;

the seventh transistor has a control electrode electrically connected to the first light emitting control signal line, a first electrode electrically connected to the second voltage signal line, and a second electrode electrically connected to the third node;

the first capacitor has a first electrode electrically connected to the third node, and a second electrode electrically connected to the second node;

the second capacitor has a first electrode electrically connected to the second node, and a second electrode electrically connected to the first node;

the second light emitting control module comprises an eighth transistor;

the eighth transistor has a control electrode electrically connected to the second light emitting control signal line, a first electrode electrically connected to the fourth node, and a second electrode electrically connected to the anode;

the compensation module comprises a second transistor and a ninth transistor;

the second transistor has a control electrode electrically connected to the reset signal line, a first electrode electrically connected to the fourth node, and a second electrode electrically connected to a first electrode of the ninth transistor;

the ninth transistor has a control electrode electrically connected to the second gate line, and a second electrode electrically connected to the first node;

the second control module comprises a fifth transistor;

the fifth transistor has a control electrode electrically connected to the second gate line, a first electrode electrically connected to the first voltage signal line, and a second electrode electrically connected to the second node;

the refresh module comprises a first transistor;

the first transistor has a control electrode electrically connected to the first gate line, a first electrode electrically connected to the data signal line, and a second electrode electrically connected to the third node;

the first reset module comprises a sixth transistor;

the sixth transistor has a control electrode electrically connected to the reset signal line, a first electrode electrically connected to the first initial signal line, and a second electrode electrically connected to the anode;

the seventh transistor is configured to be controlled by the first control signal of the first light emitting control signal line, the eighth transistor is configured to be controlled by the second control signal of the second light emitting control signal line, and the seventh transistor is further configured to be turned on preceding the eighth transistor and keep turned on in the first light emitting phase under the control of the first control signal of the first light emitting control signal line and the second control signal of the second light emitting control signal line;

a duration of the gate signal of the second gate line is configured to cover a duration of the gate signal of the first gate line plus a duration of the reset signal of the reset signal line, and the duration of the gate signal of the first gate line is configured to be less than the duration of the reset signal of the reset signal line; and the gate signal of the second gate line is configured to be positive voltage to turn on the fifth transistor, and the reset signal of the reset signal line is configured to be negative voltage to turn on the sixth transistor in a compensation phase; and the gate signal of the second gate line is configured to be the negative voltage to turn off the fifth transistor, and the reset signal of the reset signal line is configured to be the negative voltage to turn on the sixth transistor in a second reset phase, wherein the second reset phase follows the first light emitting phase.

2. The pixel driving circuit according to claim 1, further comprising:

a second reset module, wherein the second reset module is electrically connected to a scan signal line, a second initial signal line, and a sixth node, and configured to reset the driving module via an initial signal of the second initial signal line under the control of a scan signal of the scan signal line; and a third light emitting control module, wherein the third light emitting control module is electrically connected to a third light emitting control signal line, the first voltage signal line, and the sixth node, and configured to write a first voltage signal of the first voltage signal line to the driving module under the control of a third light emitting control signal of the third light emitting control signal line.

3. The pixel driving circuit according to claim 2, wherein the second reset module comprises a twelfth transistor, and the twelfth transistor has a control electrode electrically connected to the scan signal line, a first electrode electrically connected to the second initial signal line, and a second electrode electrically connected to the sixth node; and the third light emitting control module comprises a thirteenth transistor, and the thirteenth transistor has a control electrode electrically connected to the third light emitting control signal line, a first electrode electrically connected to the first voltage signal line, and a second electrode electrically connected to the sixth node.

4. The pixel driving circuit according to claim 1, wherein the first control module comprises a fourth transistor; and the fourth transistor has a control electrode electrically connected to the first gate line, a first electrode electrically connected to the first initial signal line, and a second electrode electrically connected to the first node.

5. The pixel driving circuit according to claim 4, wherein the fourth transistor comprises an oxide transistor.

6. The pixel driving circuit according to claim 1, wherein the driving module comprises a third transistor; and the third transistor has a control electrode electrically connected to the first node, a first electrode electrically connected to the first voltage signal line, and a second electrode electrically connected to the fourth node.

7. The pixel driving circuit according to claim 1, wherein the second transistor comprises an oxide transistor.

8. The pixel driving circuit according to claim 1, wherein the ninth transistor comprises an oxide transistor, and the second transistor comprises a non-oxide transistor.

9. A display device, comprising the pixel driving circuit according to claim 1.

10. A control method for controlling the pixel driving circuit according to claim 1, comprising:

at different refresh rates, refreshing a display frame in a display frame cycle through a first reset phase, a write phase, the compensation phase, and the first light emitting phase.

11. A control method for controlling the pixel driving circuit according to claim 1, comprising:

at a first refresh rate, refreshing a display frame in a display frame cycle through a first reset phase, a write phase, the compensation phase, and the first light emitting phase; and at a second refresh rate, performing a first refresh on the display frame in the display frame cycle through the first reset phase, the write phase, the compensation phase, and the first light emitting phase, and performing refreshes other than the first refresh on the display frame through a second reset phase and a second light emitting phase.

12. The pixel driving circuit according to claim 1, wherein the fifth transistor comprises an oxide transistor.

* * * * *